July 4, 1967  O. S. CARSON  3,329,916
ELECTRIC TORQUE MOTOR
Filed Feb. 28, 1964  3 Sheets-Sheet 1

Inventor
Oliver Samuel Carson
By Cushman, Darby & Cushman
Attorneys

July 4, 1967

O. S. CARSON 3,329,916

ELECTRIC TORQUE MOTOR

Filed Feb. 28, 1964

3 Sheets-Sheet 3

Inventor
Oliver Samuel Carson
By Cushman, Darby & Cushman
Attorneys

# United States Patent Office 3,329,916
Patented July 4, 1967

3,329,916
ELECTRIC TORQUE MOTOR
Oliver Samuel Carson, Belfast, Northern, Ireland, assignor to Short Brothers & Harland Limited, Belfast, Northern Ireland, a British company
Filed Feb. 28, 1964, Ser. No. 348,136
Claims priority, application Great Britain, Mar. 6, 1963, 8,962/63
6 Claims. (Cl. 335—230)

The present invention relates to electric motors and is particularly concerned with a motor commonly known as a torque motor and of the kind in which the rotor is subjected to a first or polarising magnetic flux which holds it in a predetermined rest position and in which the motor is adapted to be energised by an electrical signal applied to one or more coils which serve to generate a second magnetic flux which exerts a disturbing force on the rotor and causes the rotor to be displaced from its rest position by an amount representative of the applied signal. The rotor includes a salient portion which cooperates with a stator which directs magnetic flux through said salient portion.

According to the present invention the salient portion of the rotor is provided with a slot or recess in the face thereof presented to the stator or with a hole or holes in the region of said face, said slot, recess, hole or holes serving to redirect flux within the rotor for the purpose of changing one or more of the characteristics of the motor.

Figure 1:
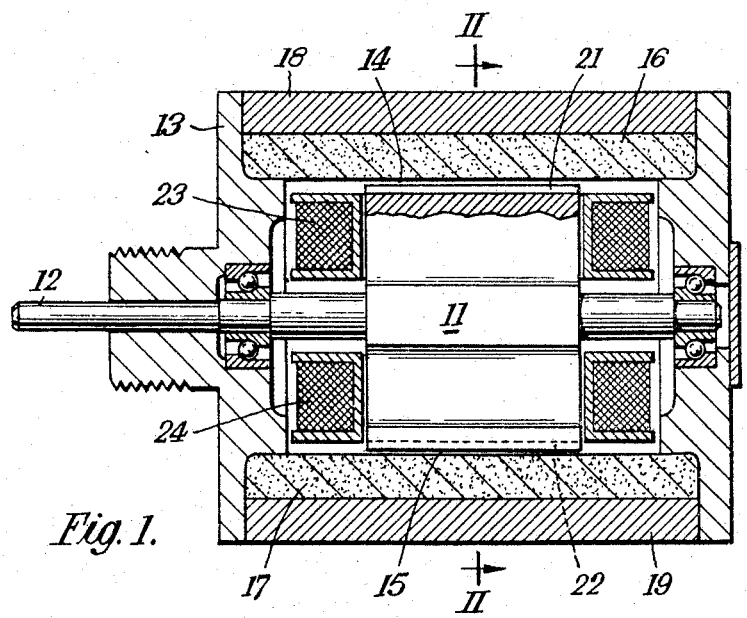
Figure 2:
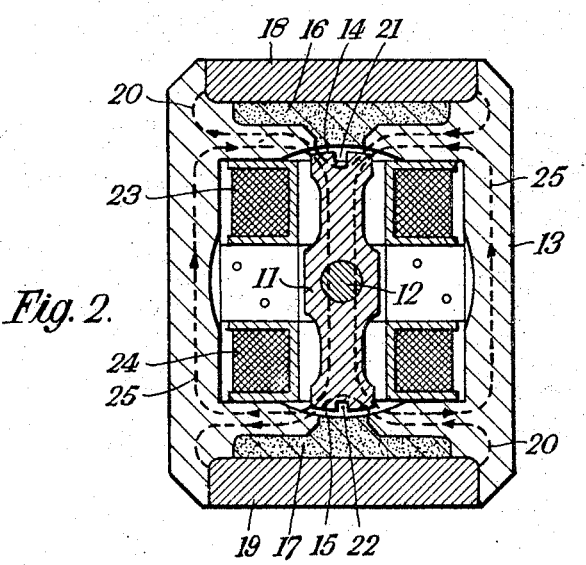
Figure 3:
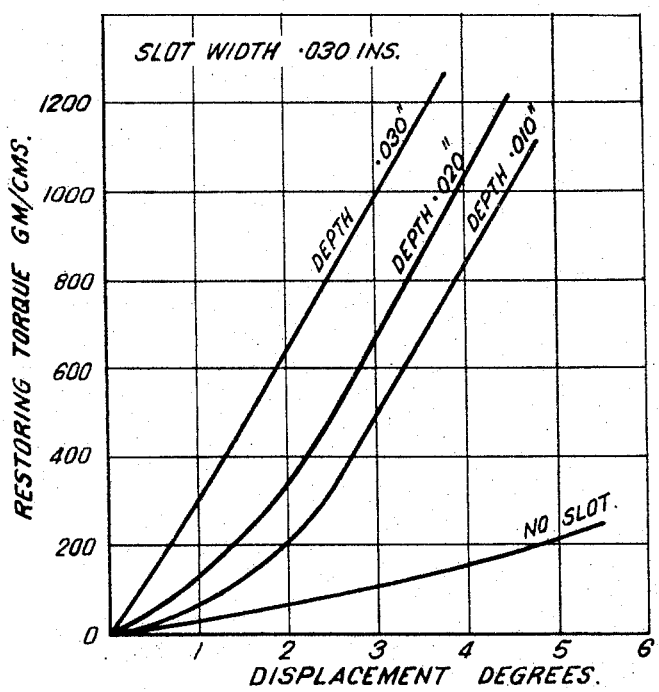
Figure 4:
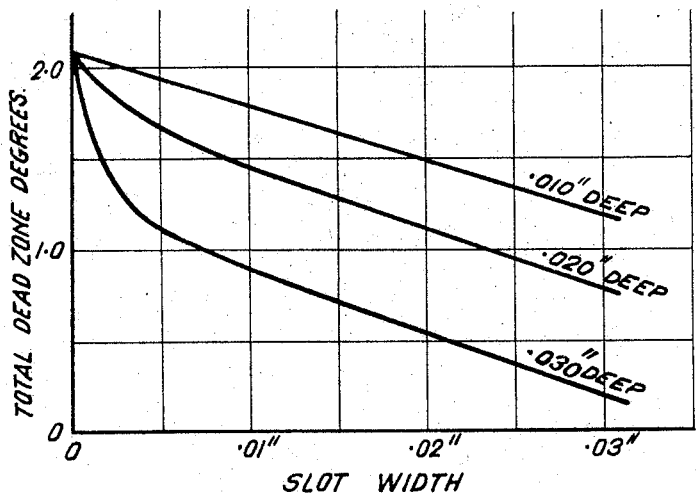
Figure 5:
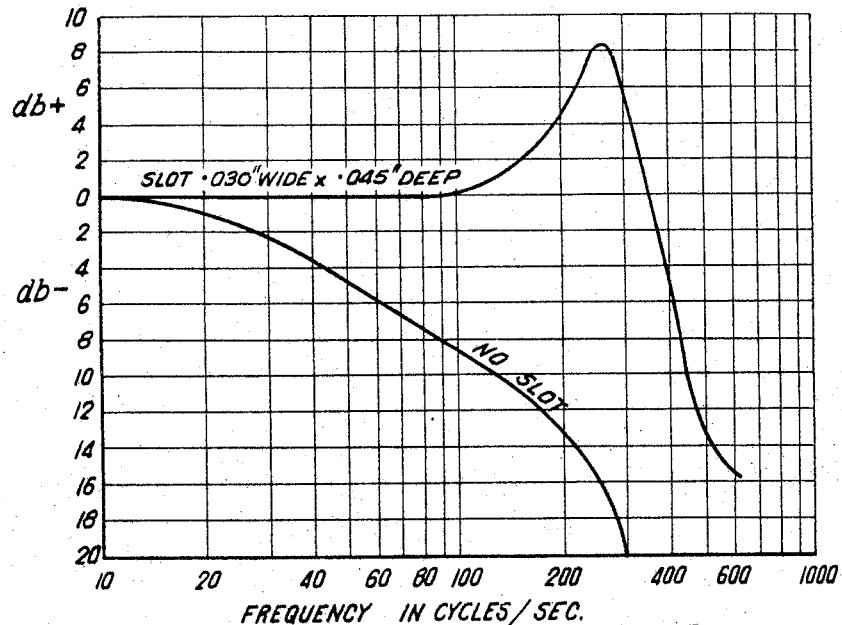
Figure 6:
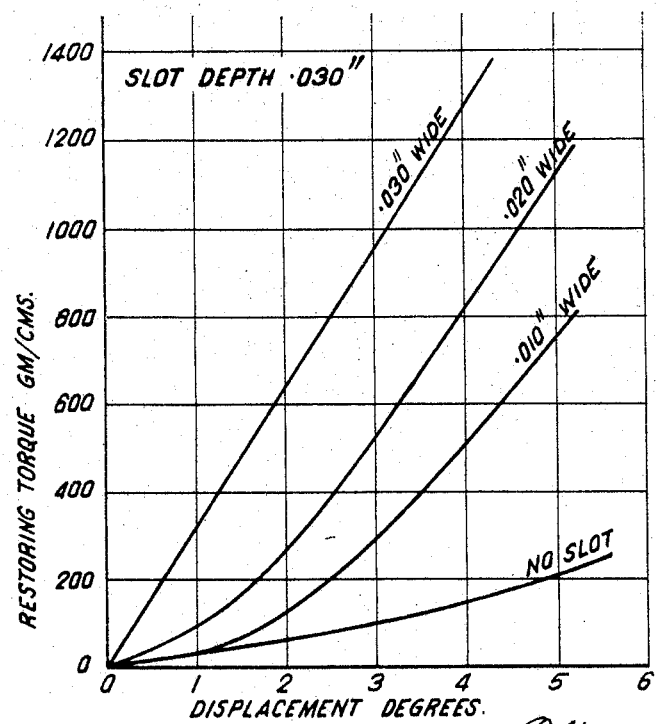

One embodiment of the invention will now be described by way of example with reference to the accompanying drawing in which FIG. 1 is a sectional side elevation of a torque motor according to the invention, FIG. 2 is a sectional end elevation of the motor shown in FIG. 1, the section being taken on the line II—II of FIG. 1, FIG. 3 is a graphical representation illustrating the increase in rotor restoring torque with increasing slot depth in the motor shown in FIG. 1, FIG. 4 is a graphical representation illustrating the decrease in the rotor dead zone with increasing slot depth in the motor shown in FIG. 1, FIG. 5 is a graphical representation illustrating the improvement in frequency response of the motor shown in FIG. 1 over that employing an unmodified rotor, and FIG. 6 is a graphical representation illustrating the increase in rotor restoring torque with increasing slot width in the motor shown in FIG. 1.

Referring first to FIGS. 1 and 2, a rotor 11 comprises a magnetic body in the general form of a flat rectangular block mounted for rotation about its central longitudinal axis on a shaft 12. The rotor 11 cooperates with a soft iron stator yoke 13 so that in the rest position of the rotor 11 the longitudinal end faces of the rotor face, across small air gaps 14 and 15, stator zones which are subdivided longitudinally by non-magnetic elements 16 and 17. The yoke 13 includes permanent magnets 18 and 19 in the region of the stator zones and the arrangement is such that permanent magnetic fluxes from the magnets 18 and 19 pass from the yoke 13 on one side of the non-magnetic elements 16 and 17 to the rotor 11, through the latter and back to the yoke 13 on the other side of the non-magnetic elements 16 and 17, as illustrated by the broken lines 20. The force produced on one longitudinal end portion of the rotor 11 by the permanent magnetic flux passing therethrough is balanced by the force produced in the same manner on the other longitudinal end portion of the rotor 11. Slots 21 and 22 of rectangular constant cross-section are formed in the longitudinal end faces of the rotor 11 and extend throughout the length of the rotor 11 along the longitudinal centre lines of the end faces.

Two energising coils 23 and 24 are mounted within the soft iron yoke 13, the coil 23 surrounding one of the longitudinal end portions of the rotor 11 and the other coil 24 surrounding the other longitudinal end portion of the rotor 11. Upon energisation of the coils 23 and 24 magnetic fluxes are set up which pass through the rotor 11, entering at one longitudinal end face and leaving at the other as shown by broken lines 25. The arrangement is such that the flux generated by the coils 23 and 24 augments the permanent flux entering at one side of one end face of the rotor and opposes that leaving the other side of the end face, thereby creating a disturbing torque on the end of the rotor 11. The fluxes generated by the coils affect the permanent flux entering and leaving the other end face of the rotor 11 and create a disturbing torque on the rotor in the same sense.

It has been found that the characteristics of a torque motor can be controlled more accurately and with greater simplicity during manufacture or design work by using a slotted rotor. By suitable choice of slot depth and width the characteristics of the motor can be controlled to close limits to give any desired characteristics within a wide range.

The results of tests carried out on a torque motor as hereinbefore described are represented in FIGS. 3 to 6. As can be seen from FIG. 3, an increase in slot depth increases the magnetic stiffness of the motor. An increase in slot depth, also reduces the dead zone of the rotor as illustrated in FIG. 4 and in addition increases the slope of the torque displacement characteristic for a given current. Increase in slot depth also increases the resonant frequency of the motor as can be seen from FIG. 5 and enables the motor to operate at much higher frequencies. An increase in slot width produces, as illustrated in FIG. 6, similar effects to those obtained by increasing the depth.

Slots with irregular sides, or straight sides and circular bottoms may if desired be employed and have either the same effect as the rectilinear slot or a less marked effect on the motor characteristics. Similarly, a series of closely spaced holes drilled radially into the end face of the rotor or longitudinally, close to the face, could if desired be employed.

Slots or combinations of slots of various dimensions, each extending along a portion of the rotor face may also be used on one, or both, rotor faces, to extend the range of characteristics possible.

What I claim as my invention and desire to secure by Letters Patent is:

1. A torque motor, comprising:
   a stator and a freely mounted rotor,
   means for generating a first magnetic flux between said stator and said rotor thereby applying a restoring torque to said rotor holding it at a predetermined rest position,
   coil means for generating, in response to an applied signal, a second magnetic flux between said stator and rotor exerting a disturbing force on said rotor causing said rotor to be displaced from its rest position against the action of said first flux by an amount representative of applied signal,
   said rotor being in the form of a flat block and having a pole face opposing a corresponding face on said stator in the rest position of said rotor and arranged to move across the stator pole face when said rotor is disturbed, and
   said pole face on said rotor having an opening extending parallel to the rotary axis, and also extending along the longitudinal center line of said pole face, thereby redirecting flux within said rotor and creating a restoring torque characteristic.

2. A motor according to claim 1, wherein the rotor comprises a magnetic body mounted for rotation in relation to the stator and having a salient portion and wherein the salient portion is formed with said opening in the face thereof presented to the stator, said opening extending parallel to the rotary axis of the rotor.

3. A motor according to claim 1, wherein the openings are rectangular cross-section slots.

4. A motor according to claim 3, wherein the rotor co-operates with a soft iron stator yoke so that in the rest position of the rotor each slotted end face of the rotor faces, across a small air gap, a stator zone which is subdivided longitudinally by a non-magnetic element.

5. A motor according to claim 4, wherein the stator yoke includes a polarising magnet in the region of each stator zone, the arrangement being such that the said polarising magnetic flux passes from the yoke on one side of the non-magnetic element to the rotor, through the rotor and back to the yoke on the other side of the non-magnetic element.

6. A motor according to claim 4, wherein energising coils are mounted within the stator yoke, one of the coils surrounding the rotor in the region of one of the end faces and the other surrounding the rotor in the region of the other of the end faces, whereby upon energisation of the coils magnetic fluxes are set up in the stator yoke and pass through the rotor entering at one longitudinal end face and leaving at the other.

References Cited

UNITED STATES PATENTS

| | | | |
|---|---|---|---|
| 2,718,614 | 9/1955 | Gamble | 317—171 |
| 2,930,945 | 3/1960 | Weathers et al. | 310—36 X |
| 3,058,038 | 10/1962 | Stedman et al. | 335—229 |
| 3,177,385 | 4/1965 | Montagu | 310—36 |
| 3,214,646 | 10/1965 | Duff | 310—36 X |

OTHER REFERENCES

Trobovich and Meyer, "Small Displacement Electro Mechanical Actuators," January-February 1960.

MILTON O. HIRSHFIELD, *Primary Examiner.*

D. F. DUGGAN, *Assistant Examiner.*